United States Patent

[11] 3,599,754

[72] Inventors William R. Caputo
 Wyckoff;
 William M. Ostrander, Hackensack, both of, N.J.
[21] Appl. No. 845,604
[22] Filed June 30, 1969
[45] Patented Aug. 17, 1971
[73] Assignee Westinghouse Electric Corporation
 Pittsburgh, Pa.

[54] MOTOR CONTROL SYSTEM
 12 Claims, 2 Drawing Figs.
[52] U.S. Cl. ................................................. 187/29 R
[51] Int. Cl. ................................................. B66b 1/30
[50] Field of Search............................................. 187/29;
 318/20, 745, 142, 143, 145, 257, 258, 260, 263,
 295, 310, 317, 329, 345, 386, 449

[56] References Cited
UNITED STATES PATENTS
1,962,344 6/1934 Geiselman..................... 318/345 X
2,667,610 1/1954 Schmitt et al.................. 318/295 X
2,743,408 4/1956 Schmitt....................... 318/295 X Primary Examiner—Oris L. Rader
Assistant Examiner—W. E. Duncanson, Jr.
Attorneys—A. T. Stratton, C. L. Freedman and Richard V. Westerhoff ABSTRACT: In a direct current drive system for an elevator, a high-gain amplifier controls the speed of the motor through variable energization of the generator field in accordance with an error signal developed as a function of the difference between a signal developed by a pattern generator and a signal developed by a tachometer. Switchless feedback circuits are provided to bring the car smoothly to a creep speed should the pattern generator or tachometer generator fail as an open circuit. A noncontinuous feedback circuit and variable damping on the pattern generator minimize jerk on one floor runs but do not interfere with leveling. Should the pattern generator fail to initiate deceleration by a predetermined point as the car approaches a terminal, a fixed low speed signal brings the car to the landing. When the car is operating on reduced pattern signals, normal door preopening is discontinued.

PATENTED AUG 17 1971

INVENTORS
William R. Caputo and
William M. Ostrander.
BY R.V. Westerhoff
ATTORNEY

MOTOR CONTROL SYSTEM

CROSS-REFERENCE TO RELATED APPLICATIONS

The commonly owned application of William R. Caputo, Ser. No. 837,442, entitled "Motor Control System" filed concurrently herewith, relates to the basic motor control system upon which the subject matter of this application operates. In order to minimize the complexity of this application, a detailed description of only those portions of the overall system necessary for an understanding of the subject matter of this application will be given. In order to complete the detailed description of the overall invention, the above-mentioned application of Caputo is hereby incorporated by reference into this application.

For the purpose of fully disclosing a working embodiment of the system, the application of Andrew F. Kirsch entitled "Pulse-Supervised Transportation Systems," Ser. No. 606,239, filed Dec. 30, 1966 now U.S. Pat. No. 3,519,106 is also incorporated by reference into this application for the purpose of disclosing a supervisory system which generates certain control signals required in the operation of the preferred embodiment of the invention described. In addition, the application of Conwell Savage entitled "Motor Control Mechanism," Ser. No. 817,789 filed on Apr. 21, 1969 and assigned to the same assignee is hereby incorporated by reference into this application for the purpose of disclosing a suitable pattern generator. Furthermore, the application of William R. Caputo entitled "Electrical Drive and Method of Operating Such Drive," Ser. No. 583,146, filed Sept. 9, 1966 now U.S. Pat. No. 3,470,434 is also hereby incorporated by reference into this application for the purpose of fully describing a suitable silicon control rectifier amplifier.

BACKGROUND OF THE INVENTION

1. Field of the Invention

This invention relates to motor control systems and has particular relation to the variable-voltage motor drive systems utilized in elevator systems.

2. Prior Art

The concurrently filed application of William R. Caputo entitled "Motor Control System" and incorporated by reference into this application, describes a variable-voltage elevator drive system utilizing a silicon-controlled rectifier amplifier to excite the field of the direct current generator directly from an alternating current source. In that system, a speed reference signal generated as a continuous function of the position of the car relative to the landings is compared with the actual speed of the motor in a drag magnet regulator. The error signal thus produced is combined with a bias signal which compensates for the lag in the response of the elevator car. The resultant signal controls the gating of portions of half-cycles of an alternating current source by the SCR amplifier to the generator field circuit. The bias signal is also necessary to initiate movement of the car since the pattern generator will generate zero voltage when the car is stopped level with a landing. Should the car become displaced from the landing through stretch or contraction of the cable by a shift in the loading of the car, releveling is accomplished by the error signal generated by the position-responsive pattern signal generator. Since the pattern signal is generated as a function of the displacement of a car from a landing, precautions must be taken to avoid excessive jerk should the car be started from a point in-between the floors such as after an emergency stop. Therefore, if the car starts from outside of the leveling zone, a positive limitation is imposed on the speed attainable by limiting the potential of the alternating current supplied to the SCR amplifier until resynchronization is accomplished at the next stop. High loop current flowing a predetermined time after the brake is set shuts down the system. Various feedback circuits such as a stabilization feedback circuit and a residual killer circuit are provided. A feedback signal proportional to the back electromotive force of the motor is also supplied when the system is operating on hand control when the pattern generator is not being utilized.

U.S. Pat. No. 3,448,364 discloses a scheme for bringing an elevator car to a stop should a speed control system which regulates the speed of the car during deceleration as a function of the remaining distance to go fail to initiate deceleration by a predetermined point as the car approaches a terminal landing. However, in that system power is cut off and the brake is set so that the car is brought to rest without any reference to the terminal landing. This leaves the passengers temporarily stranded in the car with the doors closed.

SUMMARY OF THE INVENTION

It is a primary object of the invention to provide an improved variable-voltage motor drive system.

It is an important object of the invention to provide an improved variable-voltage motor drive system of the type in which a high-gain amplifier controls the field excitation of a direct current generator as a function of the difference between the desired speed of the motor as represented by a signal generated by a pattern generator and the actual speed of the motor as represented by a signal generated by a tachometer generator wherein fail-safe means are provided to bring the car to a smooth stop should either the pattern generator or the tachometer generator fail as an open circuit.

It is a more particular object of the invention to provide a variable-voltage elevator drive system as described in the previous object wherein the fail-safe means is switchless and comprises high-impedance circuits in parallel with the pattern generator and the tachometer generator which are normally short circuited by the signal generator which they shunt.

It is an even more particular object of the invention to provide a variable-voltage elevator drive system as described in the previous object wherein the high-impedance circuit in parallel with the tachometer generator includes the armature circuit of the motor so that the pattern signal can be overridden and the car can be brought to a slow speed should the tachometer generator fail as an open circuit.

It is also an object of the invention to provide means to limit the jerk in a variable-voltage drive system used as an elevator drive when switching from acceleration to deceleration on short floor runs.

It is a further object of the invention to provide a variable-voltage elevator drive system as described in the previous object which does not interfere with leveling.

It is another object of the invention to provide means to bring an elevator car into a terminal landing at a safe speed should a pattern generator, which generates a speed reference signal as a function of the distance from a landing at which the car is to stop, malfunction and fail to initiate deceleration by a predetermined point as the elevator car approaches the terminal landing.

It is yet another object of the invention to provide means to prevent preopening of the doors when an elevator car is being driven under slow speed conditions.

BRIEF DESCRIPTION OF THE DRAWINGS

FIG. 1 is a diagram of a portion of an elevator system incorporating the invention.

DESCRIPTION OF THE PREFERRED EMBODIMENT OF THE INVENTION

Figure 2:
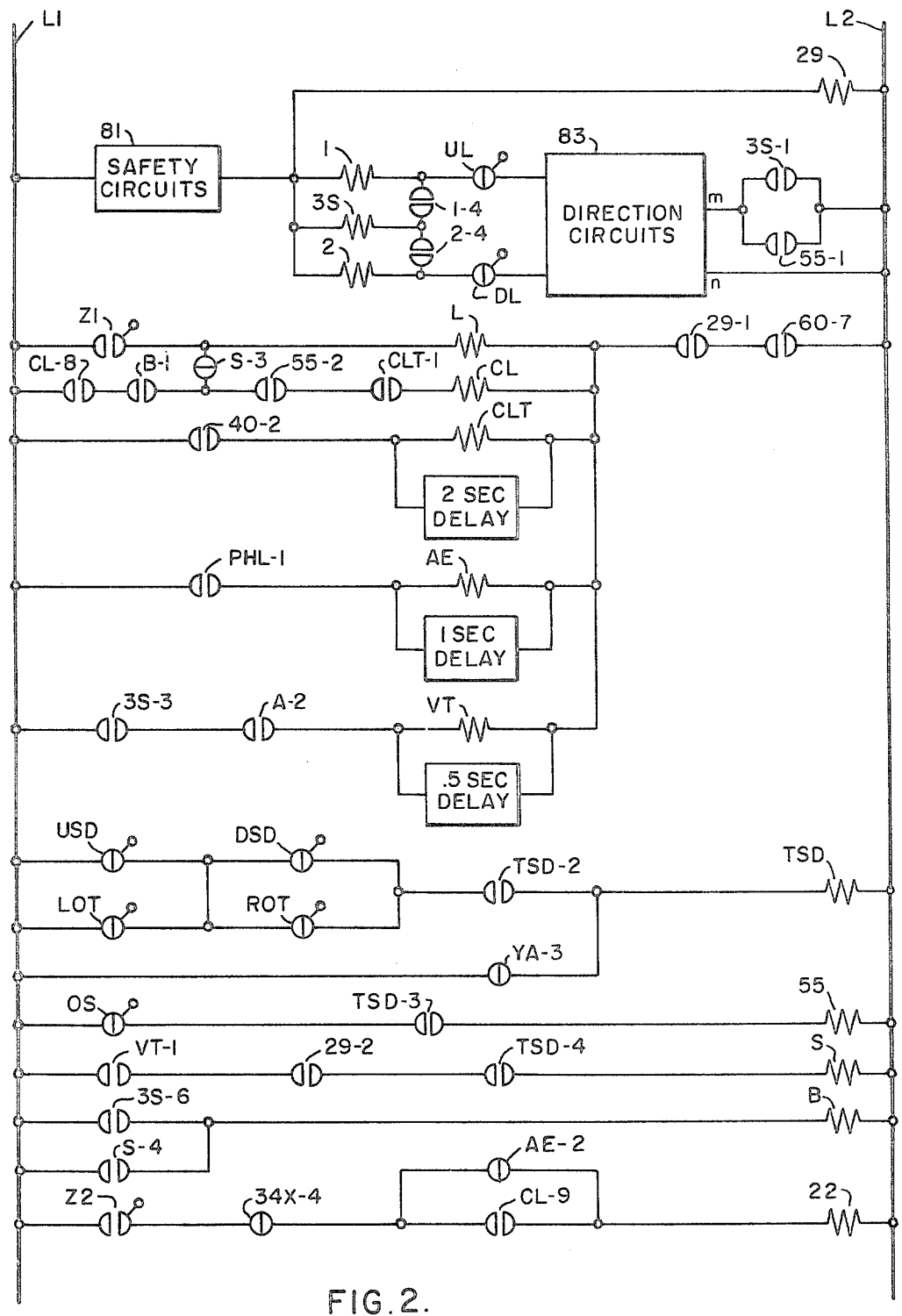
FIG. 2 is a circuit diagram in straight line form of a portion of a supervisory system which controls the operation of the elevator system disclosed in FIG. 1.

The preferred embodiment of the invention will be shown as applied to the basic system disclosed in the concurrently filed application Ser. No. 837,442 of William R. Caputo. Portions of the system not shown in detail in this application can be considered to be the same as shown in the other application. Where portions of the basic circuit must be shown in detail for an understanding of the present invention the reference characters have been preserved to facilitate cross referencing.

As an aid to understanding the drawings the relays and switches are identified as follows:

A   Brake monitor relay.
AE   Landing zone relay.
B   Holding relay.
CL   Current limiter relay.
CLT   Current limiter delay relay.
DSD   Down slowdown switch.
L   Pattern leveling zone relay.
LOT   Left full advance switch.
PHL   Photoelectric relay.
ROT   Right full advance switch.
S   Selector relay.
TSD   Terminal slowdown relay.
USD   Up slowdown switch.
VT   Stopping timer relay.
YA   Auxiliary loop current monitor relay.
Z1   Leveling zone switch.
Z2   Door preopening switch.
1   Up direction relay.
2   Down direction relay.
3S   Running relay.
22   Door preopen relay.
29   Safety circuit relay.
34X   Auxiliary stop signal.
40   Car door signal.
55   Overspeed relay.
60   Automanual relay.

The relay contacts are identified by hyphenated reference characters. The portion of the reference character before the hyphen identifies the relay with which the contacts are associated and the number after the hyphen identifies the particular contacts on the associated relay. All of the relay contacts are shown in their normal position when the relay is deenergized. For instance, the make contacts CL–5 in FIG. 1 are open when the relay CL is deenergized and closed to complete an electrical circuit when the relay 1 is energized. On the other hand, the brake contacts CL–6 are closed when the relay CL is deenergized and are opened when the relay CL picks up.

Referring to FIG. 1, a traction sheave 5 is connected to the shaft of a direct current motor 1. An elevator car identified by the general reference character 9 is supported by a cable 7 which is reeved over the traction sheave 5. A counterweight 11 is fastened to the other end of the cable 7. Rotation of the traction sheave 5 by the motor 1 causes the elevator car 9 to ascend and descend relative to landings including a lower terminal landing, an upper terminal landing and a number of intermediate landings.

The elevator car 9 is provided with a door 61 the operation of which is controlled by a door operator 63 mounted on the top of the car. The landing zone detector 65 mounted on the car comprises a light source and a photoelectric cell connected to a relay PHL (not shown) which is energized as long as the light from the light source impinges upon the photoelectric cell. When the elevator car reaches a point level with a landing, a plate 67 mounted in the hatchway adjacent each landing interrupts the light beam thereby deenergizing the relay PHL. The dimensions of the plate 67 and the landing detector 65 are such that the relay PHL will only be deenergized when the car is within approximately plus or minus one-fourth of an inch from being level with the associated landing.

A cam 69 mounted on the car serves to operate a number of normally closed switches as the elevator car moves up and down in the hatchway. As the car approaches the upper terminal landing as shown in FIG. 1 the cam 69 operates the up slowdown switch USD. When the car reaches a point just slightly above the point where the floor of the car is level with the upper terminal landing, the cam 69 operates the up limit switch UL. Similarly, when the car approaches the lower terminal landing the cam 69 operates the down slowdown switch DSD and upon continued downward movement operates the down limit switch DL when the car reaches a point slightly below the point where the floor of the car is level with the lower terminal.

The direction and speed of rotation of the motor 1 is controlled by the output of the direct current generator 3. A loop circuit formed by the interconnection of the armatures of the generator 3 and the motor 1 are shown in heavy lines in FIG. 1. The armature of the generator 3 is driven at a constant r.p.m. by an alternating current motor (not shown). The output of the generator 3 is controlled by the variable energization of the generator field winding F.

The field winding F of the generator is excited by the silicon-controlled rectifier amplifier 17. A detailed description of the SCR amplifier is given in the Caputo application Ser. No. 583,146, filed Sept. 9, 1966 which has been incorporated by reference into this application.

For present purposes a description of the operating characteristics of the SCR amplifier is sufficient. The device receives alternating current from a 110-volt alternating current supply through a transformer T3 which has a center-tapped secondary. Portions of alternate half-cycles of the two opposing alternating current voltages thus produced are gated by the SCR amplifier to the field of the generator either through choke CH1 or CH2 depending upon the polarity of the control signal applied to the input terminals $c$—$d$ of the SCR amplifier. The amplitude of the half-cycles of the alternating current voltage delivered to the SCR amplifier is unaffected by the amplifier; however, the instant during the half-cycle when the selected half-cycles are gated to the generator field is a function of the magnitude of the input signal.

The amplitude of the half-cycles gated to the generator field is affected by the current limiter. With the car running under normal conditions, make contacts CL–5 of the current limiter relay, the operation of which will be explained below, are closed while the break contacts CL–6 are open. Under these conditions the full 110-volt supply voltage is applied across the primary of T3. However, with the current limiter relay deenergized, make contacts CL–5 are open and break contacts CL–6 are closed. This interposes transformer TR2 between the supply and the primary of T3. Since transformer TR2 is a stepdown transformer the amplitude of the half-cycles gated to the generator field is reduced. The capacitor C5 and resistor R24 are placed in series across the primary of T3 to smooth out the interjection and removal of TR2 in the circuit.

Several signals, singly and in combination, can be applied to the input terminals $c$—$d$ of the SCR amplifier. One such signal is generated by the pattern potentiometer PP. This potentiometer has a fixed center tap 71 and a slider 73. The pattern potentiometer receives energization form a full-wave rectifier 75 which in turn is energized from a 110-volt AC source through the make contacts S–1 of the selector relay. Direct current output voltages of opposite polarity with respect to the neutral output lead $g$ appear at the outputs $e$ and $f$ of the full-wave rectifier 75. The neutral output $g$ is connected to the center tap 71 of the pattern potentiometer. The output $e$ is connected through variable resistor R27 to one end of the pattern potentiometer PP while the output $f$ is connected through variable resistor R28 to the opposite end of the pattern potentiometer.

Displacement of the slider 73 from the point opposite the fixed tap 71 introduces a voltage into the circuit connected to the input terminals $c$—$d$ of the SCR amplifier. The direction of the displacement determines the polarity of the voltage introduced and the amount of displacement determines the amplitude of the signal. The amplitude of the signal for a given displacement can be trimmed by the variable resistor R27 or R28 depending upon the direction of displacement. Of course these variable resistors also set the maximum signal that can be generated for maximum displacement of the slider.

Displacement of the slider in one direction from the neutral position will produce an input voltage for the SCR amplifier of a polarity which will cause the motor to turn in a direction which will raise the elevator car. Displacement of the slider in the opposite direction will produce a voltage of the opposite polarity and cause the car to descend in the hoistway. When the slider 73 is directly opposite the center tap 71, zero voltage is introduced into the SCR amplifier input circuit.

The slider 73 is connected to the pattern generator 22. The pattern generator in turn is connected to the elevator car 9. Upon command from the supervisory control 28, the pattern generator 22 displaces the slider 73 on the pattern potentiometer from the neutral position in a direction and at a rate corresponding to the desired direction of movement and rate of acceleration of the elevator car. The magnitude of the displacement determines the speed of the car. As the car approaches a floor at which it is to stop, the pattern generator will return the slider to the neutral position at a predetermined rate corresponding to the desired deceleration. A suitable pattern generator adapted for use with this system is disclosed in the Savage application mentioned above and incorporated by reference into this application. The Savage pattern generator controls acceleration as a function of the distance the car has traveled until a predetermined maximum speed is reached and controls deceleration as a function of the distance remaining to a floor at which the car is to stop.

The voltage produced by the pattern potentiometer PP is supplied to the inputs c—d of the SCR amplifier through the resistor R29. The pattern potentiometer PP is shunted by the capacitor C6. This capacitor C6 and the effective resistance introduced into the input circuit of the SCR amplifier by the pattern potentiometer PP, serve as an RC filter to dampen changes in the pattern signal. Since the effective resistance of the pattern potentiometer is higher for the higher speed settings of the slider 73, it can be seen that the filter automatically increases the amount of damping as the speed increases. It can also be appreciated that the damping is minimal at the slow-speed settings so that the response of the system during leveling is unaffected. The effect of the filter is especially useful on one floor runs when the car is switched from acceleration to deceleration before acceleration has been fully completed. The sudden switch in the mode of operation can cause discomfort to the passengers and unnecessary strain on the equipment. The filter, however, smoothes the transition from acceleration to deceleration yet it does not cause the car to overshoot since the damping is gradually removed as the car approaches the landing at which it is to stop. It can be seen then that the capacitor C6 and pattern potentiometer PP form a variably damped signal generator.

Since the pattern generator develops the speed reference signal as a function for the distance the car has traveled from the floor at which it started, difficulties are encountered when a car is brought to a stop between floors as when the emergency stop button is pulled. As was fully explained in the Caputo application, assignee's Case No. 38,779 mentioned above, a severe jolt would be introduced into the system if this signal was suddenly reapplied when the car was restarted. Under these circumstances therefore, the current limiter relay CL is energized in a manner to be disclosed below. As was already seen, the deenergization of the relay CL reduces the amplitude of the alternating current voltage supplied to the SCR amplifier. In addition, when the system is operating under automatic control so that the contacts 60–13 are closed, the contacts CL–7 close upon deenergization of the current limiter relay to introduce the resistor R30 in parallel with the pattern potentiometer. Introduction of the resistor R30 into the control circuit has the effect of further reducing the magnitude of the pattern signal applied to the inputs c— d of the SCR amplifier.

Another signal which serves as an input to the SCR amplifier is supplied by the tachometer generator 77. The tachometer generator is mechanically driven by the motor 1 and produces an output voltage proportional to the speed of rotation of the motor 1. The tachometer generator is so connected in the input circuit of the SCR amplifier that it opposes the pattern signal being developed by the pattern potentiometer PP. In other words, when the pattern potentiometer is producing a signal of a given polarity to cause the motor M to rotate in a certain direction, the rotation of the motor in this direction will cause the tachometer generator to generate a voltage opposite in polarity to the polarity of the signal being generated by the pattern potentiometer. These signals are combined in the input circuit of the SCR amplifier and the error signal thus developed controls the operation of the SCR amplifier.

Several other signals can be included in the error signal which controls the SCR amplifier. For instance the bias circuit 37, which was fully described in the concurrently filed Caputo application, introduces a signal into the input of the SCR amplifier by applying a voltage across the resistor R25. The bias circuit receives its energization from a full-wave rectifier 79 through either the 1–6 make contacts of the up direction relay or the 2–6 make contacts of the down direction relay, when the car is on automatic operation, make contacts 60–10 of the automanual relay are closed, the supervisory system is not generating a stop signal, make contacts 34X–2 of the auxiliary stopping relay are closed, and the selector relay is energized, contacts S–2 are closed. As is explained fully in the Caputo application, the bias signal is necessary in order to initiate movement of the car and to compensate for a lag in the response of the elevator car to the pattern signal. The bias circuit contains a filter circuit so that the signal generated is applied and removed smoothly.

Alternatively, a signal may be applied across the resistor R25 when the car is on automatic operation through the resistor R26 when the break contacts TSD–1 of the terminal slowdown relay are closed. The polarity of the signal thus applied depends upon whether the contacts 1–6 or 2–6 of the up or down direction relays are closed. As will be seen below, when the contacts TSD–1 are closed the contacts S–1 and S–2 of the selector relay are open to remove energization from the pattern potentiometer and the bias circuit. Under these circumstances, the fixed signal applied through the resistor R26 will generate a pattern signal which will cause the car to continue to travel in the direction in which it was traveling but at a greatly reduced speed, on the order of 30 feet per minute.

As was also fully explained in the concurrently filed application of Caputo, at times it is desirable to position the car at points in the hatchway intermediate the landings for maintenance purposes. To effect such control the break contacts 60–11 of the automanual relay are closed to supply current from the full-wave rectifier 79 to the hand control pattern generator 41 through either the up direction or down direction relay contacts 1–6 or 2–6. The hand control circuit will therefore apply a voltage across the resistor R25 which will cause the car to travel in the selected direction at a speed of approximately 60 feet per minute.

The signal generator formed by the pattern potentiometer PP and the resistor R25 is shunted by resistor R31. Since the resistors R25 and R29 are typically on the order of 1.5 K. and the resistance of the pattern potentiometer PP varies typically from a value of 0 to 1 K., the resistor R31 which is on the order of 100 K. is ineffective under normal conditions. However, should the pattern potentiometer fail as an open circuit the resistor R31 automatically, and without switching, completes the circuit for the application of the voltage of the tachometer generator 77 to the inputs of the SCR amplifier. Due to the large value of resistance of the resistor R31, the voltage output of the tachometer generator is greatly attenuated but since it is opposing the direction of rotation of the motor 1 it will bring the car smoothly to a creep speed.

It will be noticed that the resistor R36 and the armatures of the motor 1 and generator 3 form a shunt circuit around the tachometer generator 77. Since the effective resistance of the tachometer generator is on the order of 60 ohms and the resistor R36 typically has a value of 660 K., this feedback circuit is ineffective under normal conditions. However, should the tachometer generator 77 fail as an open circuit, the voltage across the motor armature would be introduced automatically and without switching into the input circuit of the SCR amplifier through the resistor R36. Since the voltage across the motor armature at design speed is on the order of 220 volts, the feedback signal applied through the resistor R36 which opposes the signal being developed by the pattern generator and the bias circuit would exceed the pattern signal tending to cause the car to travel in a given direction and again bring the car smoothly to a creep speed. Of course, as the speed of the motor is slowed down, the feedback signal decreases until an equilibrium between the pattern signal and the feedback signal is reached.

Several additional feedback circuits are provided between the armature loop circuit and the input of the SCR amplifier. A stabilization circuit feeds back a negative signal which opposes changes in speed through resistor R32, capacitor C8 and resistor R33. A residual killer circuit provides another feedback signal through the resistor R32 and the break contacts B–2 of the holding relay. This latter circuit is rendered inoperative during car movement by the energization of the B relay. However, after the car has stopped and the brake is set, the relay B is deenergized to close the contacts B–2 so that a signal proportional to the loop current is fed into the SCR amplifier with a polarity tending to drive the loop current to zero. The closing of the contacts B–2 also serves to complete a discharge path for the capacitor C8 through the resistor R33. The operation of the stabilizing and residual killer circuits is fully discussed in the concurrently filed Caputo application.

An additional negative feedback circuit is provided through the resistor R34 the back to back Zener diodes ZD1 and ZD2, and a capacitor C7. If the direction of rotation of the motor is such that the anode of the Zener diode ZD2 is positive with respect to the $c$ input of the SCR amplifier, ZD2 will be forward biased, however, flow of current in the feedback circuit will be blocked by the Zener diode ZD1 until the voltage across this diode exceeds its Zener voltage. When this voltage is exceeded, a further increase in the armature voltage will cause current to be passed through the two Zener diodes and through the capacitor C7 to the input $c$ of the SCR amplifier. This circuit provides additional damping at the higher speeds when the voltage across the motor armature exceeds the Zener breakdown voltage of diode ZD1 or ZD2. Since the motor armature voltage is approximately 220 volts at design speed, utilization of 110-volt Zener diodes $f$ or ZD1 and ZD2 provides for the additional damping above half speed. Again, this is particularly useful on one floor runs where the car has not quite completed acceleration before the pattern switches to deceleration. When the voltage across the motor armature begins to decrease, the Zener diode ZD1 becomes forward biased however, the voltage differential across ZD2 will be below the Zener voltage. Under these circumstances the capacitor C7 will discharge through the resistor R35 to apply a voltage across the inputs $c-d$ of the SCR amplifier. The resistor R35 is very large, typically on the order of 150 K., to provide slow discharge of the capacitor C7.

When the motor M is turning in such a direction that the anode of the Zener diode ZD2 is negative with respect to the input $c$ of the SCR amplifier, the Zener diode ZD1 is forward biased but the diode ZD2 will block the flow of current in the feedback circuit until the voltage across the motor armature exceeds the Zener breakdown voltage of ZD2. Above this voltage a feedback circuit will be supplied to the input of the SCR amplifier through the series RC circuit composed of capacitor C7 and resistor R34. As the magnitude of the negative potential across the motor armature decreases, the Zener diode ZD1 becomes reverse biased and, since due to the stored charge on the capacitor C7 the bias across ZD1 does not exceed its Zener breakdown voltage, the capacitor C7 will discharge through the resistor R35 and the input of the SCR amplifier to oppose the reduction in speed.

Turning to FIG. 2, the safety circuit relay 29 is energized by the busses L1 and L2 when all the contacts of the safety circuits 81 are closed. The safety circuits have been widely used for many years in the elevator industry and therefore need not be described in detail. It is enough to say that the safety circuits conventionally include contacts of the governor which trips when the speed of the car exceeds a desired speed by a predetermined amount, the emergency stop button, up and down over travel switches and perhaps such other switches as the emergency hatch open switch which indicates that the safety hatch at the top of the car is not in the closed position. It can be appreciated therefore that under normal operating conditions the circuit is completed through the safety circuits 81.

The up direction relay 1 is energized when the safety circuits are closed and the up limit switch UL is closed if the direction circuits have indicated that the car should travel in the up direction. All elevator circuit systems have direction circuits in one form or another to indicate the direction in which the car should travel. Since the direction circuits to be used herein are identical to those disclosed in the concurrently filed Caputo application they are represented in FIG. 2 by a block labeled 83. The circuit is completed for energization of the direction relays either through the output of the direction circuits labeled $n$ which is connected directly to the bus L2 or through the $m$ output which is connected to the bus L2 either through the make contacts 3S–1 of the running relay or the make contacts 55–1 of the overspeed relay. It will be seen from reference to the circuits disclosed in the concurrently filed Caputo application that the contacts 55–1 of the overspeed relay must be closed in order for the circuit to be completed initially to energize the 1 relay. Once the relay 1 is energized, its contacts 1–4 close to energize the relay 3S. With the relay 3S energized the relay 1 is held in through the 3S–1 contacts. Similarly the down direction relay 2 is initially energized through the switch DL and in turn energizes the running relay 3S through the contacts 2–4. It is only during the leveling phase on automatic control that the direction circuits are energized through the $n$ output. It can be seen from FIG. 2 that if the car ascends or descends to the point where the up limit switch UL or the down limit switch DL respectively is opened by the cam on the car that the relays 1 or 2 and 3S are deenergized.

The leveling zone relay L is energized when the safety circuits are closed, make contacts 29–1 are closed, and the car is on automatic operation, contacts 60–7 are closed, when the car is within plus or minus 2 inches from being level with the floor at which the car is making a stop, switch Z1 closed. As mentioned above, it is assumed that the Savage floor selector which has been incorporated by reference into this application is being utilized. In the Savage floor selector the control head is rotated either clockwise or counterclockwise from a vertical position as the car is accelerated. Deceleration is controlled by the return of the control head to the neutral vertical position. As the control head approaches the neutral vertical position a cam 215 in the Savage application on the control head operates a push switch 221 as the car reaches a point 2 inches from the landing. The switch Z1 in FIG. 2 corresponds to the switch ZZ1 in the Savage disclosure.

The current limiter switch CL can also only be energized when the car is on automatic control and the safety circuits are closed. The relay CL can only be energized initially if the car is started in the leveling zone, switch Z1 closed and break contacts S–3 of the selector relay are closed. In addition, the overspeed relay 55 must be energized indicating that the car has not been in an overspeed condition, contacts 55–2 closed. Furthermore the doors of the car must be closed so that the contacts CLT–1 of the current limiter timer relay are closed. Once the relay CL is energized it is held in by its holding contact CL–8 and the make contacts B–1 of the holding relay once the car is running.

The current limited timer relay also will only be energized when the safety circuits are closed and the car is on automatic control. In addition the car door must be closed, make contacts 40–2 closed. The relay CLT is provided with a 2-second delay in dropout. Devices for achieving this delay in dropout such as a series RC circuit shunting the relay are well known in the elevator art.

The landing zone relay AE will be energized when the safety circuits are closed and the car is on automatic control as long as the make contacts PHL–1 of the photoelectric relay are closed. It will be remembered that this relay is energized continuously except when the car is within plus or minus one-fourth of an inch of being level with the landing. The relay AE is provided with a 1-second delay in dropout to prevent deenergization of this relay as the car passes floors at which it is not to stop.

The stopping timer relay VT is energized when the safety circuits are closed and the car is on automatic control when the running relay is energized, contacts 3S–3 closed and the brake has been lifted, contacts A–6 of the brake monitor relay are closed. As was discussed in the concurrently filed Caputo application the standard elevator brake is spring biased to the braking condition. The brake is released by an electromagnet when the car is to start. The relay A is energized when the brake plunder has moved a short distance indicating that the brake has been released. The relay VT is also provided with a ½-second relay in dropout.

The terminal slowdown relay TSD can only be picked up through the break contacts YA–3 of the auxiliary loop current monitor relay. As was fully discussed in the concurrently filed Caputo application, this relay is picked up and remains picked up once the motor generator set is put on the line. Therefore the relay TSD is energized when the power is initially applied to the system. Once picked up, the relay TSD remains energized through its holding contacts TSD–2, either the down slowdown switch DSD or the right full advance switch ROT, and either the up slowdown switch USD or the left full advance switch LOT. The switches LOT and ROT correspond to the switches 227 and 229 in the Savage application which are opened when the control head on the floor selector reaches the full advance position and the car is traveling at full speed in the up or down direction respectively.

As was mentioned previously, the normally closed switch USD is opened momentarily by a cam on the car as the car approaches the upper terminal. Similarly the normally closed switch DSD is opened momentarily by the cam on the car as the car approaches the lower terminal. It can be seen that if the car has not begun to decelerate so that the switch LOT is still open as the car approaches the upper terminal and the switch USD is opened, the terminal slowdown relay TSD will be dropped out. Likewise, if deceleration has not been initiated as the car reaches a predetermined point in the hatchway as it approaches the lower terminal, both the switches ROT and DSD will be opened to drop out the relay TSD. Once the relay TSD is dropped out it cannot be reenergized until a maintenance man recycles the MG switch.

The overspeed relay 55 can only be energized if the terminal slowdown relay is picked up (contacts TSD–3 are closed). This relay remains energized as long as the switch OS remains closed. The normally closed switch OS on the governor will open when the speed of the car exceeds the design speed by 10 percent. Once tripped the switch OS remains open until it is reset.

A selector switch S in energized while the car is running on automatic control, make contacts FT–1 of the stopping timer relay are closed, as long as the safety circuits are closed and the terminal slowdown relay is picked up, contacts 29–2 and TSD–4 are closed.

The holding relay B is energized whenever either the running relay or the selector relay are energized, contacts 3S–6 or S–4 are closed.

It is conventional in modern elevator systems to initiate opening of the car doors as the car approaches the landing to expedite the transfer of passengers. However, when the car is being run at slow speed, which under the system described occurs when the relay CL is dropped out, the door should not be opened before the car reaches the floor since passengers will be inclined to trip when the doors open before the car is level. The door preopening relay 22 will be energized to initiate preopening of the doors when a stop signal has been generated, break contacts 34X–4 of the auxiliary stopping relay are closed, as the car approaches the landing, switch Z2 closed, if the car is operating under normal conditions, contact CL–9 of the current limiter relay are closed. The switch Z2 corresponds to the switch 223 on the Savage floor selector which is closed by the cam 217 when the car approaches within 10 inches of the landing at which it is to stop. The door control circuits are well known in the art. The energization of the relay 22 can be utilized to generate a signal 22 which will initiate door opening through the circuits of the supervisory system disclosed in the Kirsch application mentioned above. The relay 22 will also be energized when a car which is idle at a floor, switch Z2 and contacts AE–2 are closed, if the car is assigned to a corridor call which is registered at that floor, contacts 34X–4 close.

OPERATIONS

As an aid to understanding the invention, some typical operations should be considered. Assume that the elevator car is idle at the lower terminal floor with the doors open. Under these conditions the direction relays 1 and 2 and the running relay 3S will be deenergized. With the relay 3S dropped out, the relay VT and therefore the selector relay S will be deenergized. With the contacts S–1 and S–2 in FIG. 1 open no power will be supplied to the pattern potentiometer or the bias circuit. With the contacts 3S–2 in FIG. 2 open, the relay CL will be dropped out so that the contact CL–5 in FIG. 1 will be open while the contact CL–6 will be closed. Under these circumstances then, reduced potential will be supplied to the SCR amplifier 17 however, since no input signal is being supplied to the amplifier no portion of the half-cycles of the alternating current potential applied to the SCR amplifier will be delivered to the field of the generator. With the door open, the contacts 40–2 will be open so that the relay CLT will be deenergized. The relay TSD will be energized at this point through its holding contacts TSD–2 while the contacts YA–3 are open.

Assume now that a passenger enters the elevator car at the lower terminal and registers a call for the second floor. Conventional supervisory circuits (not shown) will complete circuits to close the car doors. When the car doors are closed the contacts 40–2 will close to energize the relay CLT which has no effect on the system at this point. Circuits within the supervisory system will also activate relays which will complete the direction circuits through the closed overspeed contacts 55–1 to energize the up direction relay 1. Energization of this relay results in closing of the contacts 1–4 to energize the running relay 3S. Contacts 3S–1 of the running relay in parallel with the overspeed relay contacts will therefore be closed. Since the car is within the first floor leveling zone, the switch Z1 will be closed and the relay CL will be energized through the contacts S–3 of the selector relay, the contacts 55–2 of the overspeed relay and the now closed contacts 3S–2 of the running relay.

Energization of the CL relay results in the application of full potential to the SCR amplifier through the closure of the CL–5 contacts and the opening the CL–6 contacts in the power supply circuit. Opening of the CL–7 contacts disables the resistor R30 shunting the pattern potentiometer PP.

Energization of the 3S relay results in energization of the brake relay (not shown) and when the brake plunger is released the brake monitoring relay A (not shown) is energized. Closure of the A–2 contacts in FIG. 2 completes the circuit for energization of the stopping timer relay VT. Closure of the contacts VT–1 completes a circuit for energization of the selector relay S. Opening of the S–3 contacts does not result in dropout of the CL relay however since the relay is held in by the CLT–1 contacts. Closure of the S–1 contacts in FIG. 1 completes the circuit for energization of the full-wave rectifier of the pattern signal generator however, no signal is supplied by the pattern potentiometer PP to the SCR amplifier at this time since the movable tap 73 is opposite the fixed tap 71 when the car is at rest at a landing. Since the contacts 1–6 of the up direction relay, contacts 60–10 of the automanual switch and the contacts 34X–2 of the auxiliary stopping relay are all closed at this time, the bias circuit is energized upon the closure of the S–2 contacts. It will be remembered that at this point the terminal slowdown relay TSD is energized so that the contacts TSD–1 are open. Energization of the bias circuit 37 results in the application of a voltage across the resistor R25 which introduces a signal into the inputs of the SCR amplifier tending to energize the motor to cause the car to travel in the up direction.

As the car begins to move, a voltage tending to oppose the voltage introduced by the bias circuit is generated by the tachometer generator. Since this signal will be less than the signal introduced by the bias circuit, the resultant error signal will continue to cause the car to accelerate in the up direction. Movement of the car also results in operation of the pattern generator 22. The pattern generator begins to displace the slider 73 on the pattern potentiometer PP in a direction which produces a signal tending to increase the speed of the car in the up direction. Since the resistance introduced into the input circuit of the SCR amplifier at this point is very small the damping effect caused by the pattern potentiometer in the capacitor C6 is very small at this point. The increase in the input signal to the SCR amplifier causes the motor to turn faster which in turn causes the car to advance farther in the up direction. The pattern generator in turn displaces slider 73 farther from the neutral position as a function of the distance the car has traveled. The car will therefore quickly and smoothly accelerate in the upward direction. When the speed of the car exceeds half speed the voltage across the motor armature will exceed the Zener breakdown voltage of say the Zener diode ZD1. The feedback circuit therefore applied to the SCR amplifier through the resistor R34 and capacitor C7 will tend to resist further increase in the speed of the car and therefore will tend to dampen changes in the car speed.

As the car is accelerated in the upward direction the cam 69 (see FIG. 1) will momentarily open the switch DSD. However, since the car will still be accelerating so that the right full advance switch ROT on the pattern generator will remain closed, the relay TSD will remain energized.

Assuming that the car requires more than half the distance between the first and second floor to accelerate to full speed, the stop signal for the second floor will be generated before the car has completed acceleration. Generation of the stopping signal results in the opening of the 34X–2 contacts of the auxiliary stopping relay to deenergize the bias circuit. The bias signal will not be removed instantaneously however due to the energy stored in the capacitors in the bias circuit. Generation of the stopping signal also causes the pattern generator to begin to return the movable tap 73 towards the neutral position opposite the fixed tap 71. Since an appreciable amount of resistance is inserted in parallel with the capacitor C6 by the pattern potentiometer at this point the charge stored on the capacitor C6 tends to oppose and therefore dampen any sudden effect of the reduction in the pattern signal.

Furthermore as the motor begins to slow down due to the reduction in the pattern potential, the charge stored on the capacitor C7 reverse biases the diode ZD2. This charge stored on a capacitor C7 also opposes any sudden reduction to the input signal applied to the SCR amplifier. This charge will be dissipated slowly through the large resistor R35 and the input circuit of the SCR amplifier.

As the pattern potentiometer is brought to the neutral position by the pattern generator, the switch Z2 on the control head of the pattern generator will be closed when the car is approximately 10 inches below the level of the second floor. Since at this point the auxiliary stopping relay 34X is deenergized so that the contacts 34X–4 are closed and since the contacts CL–9 of the current limiting relay are closed the door preopening relay 22 will be energized. The energization of this relay will initiate door opening through conventional door control circuits (not shown). When the car reaches the level position the plate 67 will interrupt the photoelectric circuit in the photoelectric detector 65 to drop out the relay PHL and therefore open the contacts PHL–1 in FIG. 2. One second later the landing zone relay AE will drop out to interrupt the circuit for the up direction relay 1 and the running relay 3S in their direction circuits. One-half second after the relay 3S is deenergized the relay VT will drop out to deenergize the S relay. Deenergization of the S relay will remove the power supplies from the full-wave pattern potentiometer and also open the contacts S–2 through the bias circuit. With the contacts 3S–6 and now S–4 open the relay B will be deenergized to close the contacts B–2 in the residual killer circuit shown in FIG. 1. Completion of this feedback circuit will result in the application of a signal to the SCR amplifier tending to drive the loop current in the motor and generator armature circuits to go to zero.

Assume now that the car is assigned to proceed to the top terminal landing. The doors will close and the car will accelerate in the up direction in the manner previously described. Assuming that there are several floors between the second landing and the upper terminal, the car will reach full speed when the control head on the pattern generator reaches the full advance position and opens the switch ROT. Assume now that a malfunction occurs in the pattern generator as for example assume that the drive tape becomes disconnected so that the control head remains in the full advance position. Under these conditions movement of the car will not be detected and no stop signal will be generated when the car approaches the upper terminal.

When the car passes the point where deceleration for a stop at the upper terminal would normally be begun, cam 69 on the car will momentarily open the switch USD. Normally this would have no effect on the system because if deceleration had been initiated the control head would not be in the full advance position and the switch LOT would be closed to maintain the terminal slowdown relay TSD energized. However, with the pattern generator locked in the full advance position so that the switch LOT remains open, the momentary opening of the switch USD results in dropout of the terminal slowdown relay TSD. Deenergization of this relay opens the holding contacts TSD–2 so that the relay is not reenergized when the switch USD again closes as the car continues up the hatchway. As was mentioned previously, the contacts UA–3 of the auxiliary loop current monitor relay remain open once the motor generator set has been placed on the line. Therefore, the terminal slowdown relay TSD remains deenergized.

The dropout of the relay TSD causes the contact TSD–4 to open thereby deenergizing the selector relay S. Opening of the contacts S–1 and S–2 results in deenergization of the pattern potentiometer and the bias circuit respectively thereby removing the signals tending to cause the car to travel in the up direction. However, closure of the contacts TSD–1 results in the application of a voltage across the resistor R25 tending to cause the car to continue traveling in the up direction since the contacts 1–6 remain closed. The sudden reduction in the up direction command signal is dampened somewhat by the damping effect of the capacitors C6 and the large resistance introduced in the circuit by the pattern potentiometer at this point. The sudden change in the speed of the system is also opposed by the charge stored on the capacitor C7.

Opening of the contacts TSD–3 results in dropout of the overspeed relay 55. Opening of the contacts 55–2 deenergizes the relay CL which in turn reduces the potential the alternating current applied to the SCR amplifier through the transformer T3. The car will therefore proceed upward toward the upper terminal at a fixed speed, typically at about 30 feet per minute.

Under the conditions described, that is where the control head on the pattern selector becomes stranded in the full advance position, the switch Z2 will not be closed to initiate preopening of the doors as the car approaches the landing. Opening of the contacts 55–1 does not result in deenergization of the up direction relay and the running relay 3S since these relays are held in by the contacts 3S–1 of the running relay. When the car reaches a point slightly above the normal level position cam 69 on the car will open the up limit switch UL to deenergize the direction relay 1 and the running relay 3S. Opening of the contacts 1–6 results in the removal of the signal tending to drive the car in the upward direction and dropout of the relay 3S results in application of the brake (not shown).

By referring to the concurrently filed application of Caputo it will be seen that the running relay 3S and the direction relay cannot be reenergized until the contacts 55–1 of the overspeed relay are reclosed. However, it can be seen from FIG. 2 that the relay 55 cannot be reenergized until the contacts TSD–3 of the terminal slowdown relay are reclosed. This relay cannot be reenergized, it will be remembered, until the motor generator set is shut down and restarted. Therefore, the car will remain at the upper terminal until a maintenance man corrects the malfunction.

It should be noticed that should the overspeed relay be deenergized because the car exceeds the design speed by over 10 percent, that again the potential to the SCR amplifier will be reduced through the deenergization of the relay CL. The car will continue traveling under the control of the pattern generator through manipulation of the pattern potentiometer, however, the car will travel at a lower speed. The pattern signal will be further reduced by the shunt resistor R30 through the closure of the contact CL–7. Since the car is traveling at a much lower speed it would not be desirable to open the doors when the car reached a point 10 inches from the landing in order to protect people from stumbling over the landing sill. Consequently as the car reaches a point 10 inches from the landing and the pattern generator closes the switch Z2 the contact CL–9 will now be opened so that the door preopening relay 22 cannot be energized. Since the car is not yet level with the landing the contacts AE–2 of the landing zone relay will also be open.

Consider now the car is traveling at full speed and that the pattern potentiometer PP fails as an open circuit. With the motor turning at full speed, the tachometer generator is generating a sizable signal tending to oppose the pattern signal. Although it is desirable to bring the speed of the car quickly under control under these conditions, application of the full voltage of the tachometer at this point would cause a severe jolt to the system. However, with the large resistor R31 now in series with the tachometer generator a great deal of the tachometer generator signal is attenuated in the resistor R31 therefore resulting in the application of a moderate signal to the SCR amplifier tending to reduce the speed of the car. Similarly, should the tachometer generator fail as an open circuit while the car is traveling at full speed the loss of the retarding portion of the error signal would result in a very large signal being applied to the SCR amplifier tending to increase the speed of the motor. However the tachometer generator is shunted by a circuit including the armatures of the motor and the generator and the resistor R36. Although as mentioned previously the resistor R36 is very large, on the order of 660 K. while the resistors R25 and R29 are only 1½ K. and the effective resistance of the pattern potentiometer at maximum speed is only on the order of 1 K., the voltage across the motor is much larger than the pattern voltage or the bias voltage so that the feedback signal applied through the resistor R36 exceeds the sum of the bias voltage and the pattern voltage thereby resulting in a resultant voltage which tends to bring the car to a slow speed. It can be seen therefore that should either the pattern potentiometer or the tachometer generator fail as an open circuit the car is smoothly brought to a slow speed. The automatic slowdown is fail-safe in that no switching is required to effect the slowdown.

We claim as our invention:

1. A variable-voltage system comprising a direct current motor, a direct current generator, connections for energizing said motor in accordance with the voltage output of the generator, and a source of field excitation for said generator including first signal-generating means for generating a signal attenuate to the desired speed of said motor, second signal-generating means for generating a signal proportional to the actual speed of said motor, said signal-generating means being connected in series opposition to generate an error signal, means responsive to said error signal for supplying the field excitation for said generator as a function of the error signal, and first shunting means shunting one of said signal-generating means, said shunt means having an impedance many times the impedance of said one signal-generating means, whereby said shunt means is short circuited by said one signal-generating means under normal conditions and serves to attenuate the component of the error signal produced by the other signal-generating means when said one signal-generating means fails as an open circuit.

2. The system of claim 1 including second shunting means shunting said other signal-generating means and having an impedance many times the impedance of said other signal-generating means whereby should either signal-generating means fail as an open circuit the component of the error signal produced by the functioning signal-generating means will be attenuated.

3. The system of claim 1 wherein said one generating means is the second signal-generating means and wherein said first shunting means shunting said second signal-generating means includes the armature circuit of said motor whereby the speed of the motor is smoothly reduced to a safe value when said second signal-generating means fails as an open circuit.

4. The system of claim 3 wherein second signal-generating means is a tachometer generator.

5. In an elevator system, a structure having a plurality of landings including a terminal landing, an elevator car mounted for movement relative to the structure to serve the landings, and motive means for controlling the movement of said elevator car between the landings, said motive means including, a motor connected to the car, a pattern generator having a deceleration mode for generating a speed reference signal to control the speed of the motor as a function of the displacement of the car from a landing at which the car is to be stopped, detector means operative from a first to a second condition as the car approaches the terminal landing, an auxiliary speed reference signal generator operative to apply a slow-speed reference signal to the motor in response to the operation of said detector means to said second condition when said pattern generator is not in said deceleration mode as the car approaches the terminal landing, and limit means operative when the car arrives substantially adjacent the terminal landing under control of the auxiliary speed reference signal generator to stop the motor.

6. The system of claim 5 including means responsive to the operation of said detector means to the second condition when said pattern generator is not in the deceleration mode to prevent the restarting of the motor after the motor has been stopped by said limit means.

7. A variable damped pattern generator for generating a speed reference signal in a motor speed control comprising a variable tapped resistor, electrical supply means for applying an electrical voltage across said resistor, means for varying the position of the variable tap in accordance with desired changes in the speed reference signal, a fixed tap on the resistor, output means connected to the variable tap and the fixed tap on the resistor, and capacitive reactance shunted across the output means to form an RC filter with the variable resistance across the output means whereby appreciable damping of variations in the speed reference signal is provided at high-speed settings of the variable tap when the resistance across the output means is substantial while negligible damping is imposed at low-speed settings of the variable tap.

8. The variably damped pattern generator of claim 7 in combination with an elevator speed control system comprising an elevator car mounted for movement to serve a plurality of landings, a motor for effecting the movement of the elevator car, and energizing means for energizing the motor in accordance with the speed reference signal generated by the pattern generator, the electrical supply means of said pattern generator including means to apply voltages of opposite polarity to the opposite ends of said resistor whereby the pattern generator will supply a signal of a first polarity to the energizing means to cause the elevator car to move in the up direction when the variable tap of the resistor is between the fixed tap and one end of the resistor and will supply a signal of the opposite polarity to the energizing means to cause the motor to move the elevator car in the down direction where the variable tap is between the fixed tap and the opposite end of the resistor.

9. In an elevator system, a structure having a plurality of landings, a car mounted for movement relative to the structure to serve the landings, door means on the elevator car for controlling the passage between the elevator car and any of the landings at which the car is stopped, door-operating means for opening and closing the door means, control means for controlling the speed of the car as a function of the displacement of the car relative to a landing from which the car is started and relative to a landing at which a stop is to be made, preopening means responsive to the control means for causing the door-operating means to begin opening the door means as the car approaches a landing at which a stop is to be made, limiting means operative to limit the speed attainable under control of the speed control means when the car is started from a point other than a point substantially adjacent a landing, and means responsive to the operation of the limiting means to render the preopening means ineffective to cause the door-operating means to begin opening the door means as the car approaches a landing at which a stop is to be made.

10. In a variable-voltage system including a direct current motor, a direct current generator, connections for energizing said motor in accordance with the output of said generator, control means for controlling the speed of the motor through variable energization of the generator field winding in accordance with an error signal, error signal generating means operative to generate a signal representative of the difference between a desired speed and the actual speed of the motor connected across the inputs of the control means and noncontinuous negative feedback means connected between the motor armature and the inputs of said control means in opposition to said error signal, said noncontinuous negative feedback means comprising switching means operative to block the passage of current until the voltage across said switch exceeds a predetermined value, a capacitor connected between the switching means and one input of the control means and an impedance connected between the switch means and the second input terminal of the control means, whereby the response of the motor to variations in the error signal is damped only above speeds at which the voltage across the motor armature exceeds said predetermined voltage.

11. The system of claim 10 wherein said switching means is operative to block the passage of current through the noncontinuous negative feedback means in either direction until the voltage across the switching means in either direction exceeds the predetermined voltage, whereby the noncontinuous negative feedback means is operative to dampen the response of the system above a predetermined speed for either direction of motor rotation.

12. The system of claim 11 wherein said switching means comprises two Zener diodes each with a Zener breakdown voltage equal to said predetermined voltage connected back-to-back in series in said noncontinuous negative feedback means.